INVENTOR:
WOO F. CHOW,
BY Dudley T. Heady
HIS AGENT.

3,149,241

TUNNEL DIODE SWITCHING CIRCUITS

Woo F. Chow, Philadelphia, Pa., assignor to General Electric Company, a corporation of New York Filed June 19, 1961, Ser. No. 118,031
11 Claims. (Cl. 307—88.5)

This invention relates to digital computer circuits utilizing tunnel diodes for high-speed operation. In particular, a novel bistable circuit is disclosed which is suitable for general logic and memory applications. The circuit is characterized by an increase in the available output current and a relaxation of tolerance requirements on the circuit components.

For many purposes, digital computer circuits and circuits performing analogous data processing functions can be considered as complex organizations of a large number of simple switching circuits, the switching circuits being comprised of only a few types. For example, arithmetic units include large numbers of gates which perform the primitive "AND" or "OR" logic functions. The digital information in a computer can be in several forms, but most frequently is in the form of voltage levels representing binary bits, "1" and "0." Where 1's are represented by a selected voltage and 0's by a zero voltage level, it is the function of an AND gate to produce a 1 output voltage when all the inputs have a 1 voltage and to produce a 0 output voltage when at least one input is a 0 voltage. In a dynamic system, where the input signals are in a pulse form, the output signals of a switching circuit will usually be in the same pulse form or adapted to be compatible with pulses. For other applications such as memory arrays, it is more essential that the circuit maintain one of two stable operating points in accordance with the desired output information.

A bistable circuit has by definition two stable operating points. It is therefore inherently a memory device, and when provisions are made for selecting the desired operating point and subsequently sensing the operating point it can be used as a storage element. Also, when input signals are combined to control switching of the bistable device between the stable points, the circuit can be designed to produce an output pulse in accordance with this switching action. Whatever particular logic function is desired, the switching circuits, to which the invention pertains, may be considered to distinguish whether or not a combination of input signals exceeds a "threshold" value required to switch the bistable element and produces an output signal accordingly.

The "threshold" concepts are essential to the novel circuit configurations disclosed herein. Threshold operation of a bistable element implies an ability of a bistable element to grossly discriminate between a 0 and a 1 input signal in effecting a change in condition. This type of operation, measured in tolerance to variation in the individual input signals, places increasingly greater demands upon the reliability of the threshold response.

The tunnel diode is a new two-terminal device having a negative resistance characteristic in the forward direction of bias which has inherent advantages over prior art devices because of the exceptional capability for high-speed operation, ruggedness and relative device simplicity. A graphical representation of the device's current characteristic as a function of applied forward bias voltage produces an N-shaped negative resistance characteristic. Because of this negative resistance property, the tunnel diode can have two voltage bias points for a given current point and is therefore inherently operable as a bistable switch. An example of a disclosure of the general considerations involved appears in the article by I. A. Lesk and J. J. Suran, "Tunnel Diode Operation and Application" in Electrical Engineering, April 1960.

Bistable tunnel diode circuit configurations are suitable for general, high speed logic and memory functions. When input signals are connected in parallel through equal summing resistors and applied to a tunnel diode circuit having proper bias, the summed current can be used to switch the tunnel diode between two stable operating points. This is the so-called threshold operation. For example, the summing resistors can be selected so that it is necessary to have a 1 input signal through all resistors to switch the tunnel diode from a low-voltage point to a high-voltage point. The resistors then perform the AND logic function and the tunnel diode provides a voltage and/or current gain. If the resistors are selected so that any 1 input signal will switch the tunnel diode an OR logic function is performed. In both cases, the tunnel diode makes a switching response if the combined signals exceed the "threshold" current. The use of resistor networks to combine input signals by analog summation to provide a combined current above or below a threshold value in accordance with logic is conventional and has been applied to tunnel diode circuits, note the above cited publication.

Regardless of the kind of logic performed, the tunnel diode circuit is expected to produce one of two output states. These two output states must be easily distinguishable and substantially insensitive to variations in the individual input signals and different combinations of input signals which produce the same output state. Reliable operation has typically required tolerances to be less than 5% in the diodes, associated components and input signals.

With tunnel diode circuits, the output states are "stable" in that they will be maintained after the input signals are removed. Accordingly, a bistable tunnel diode circuit is inherently capable of a memory function, and because of the fast response times, it can be used in systems operating at 100 mc. bit rates. One application of devices performing a memory function is in data storage matrix arrays. In such an application, only one input signal is generally applied to each switching circuit, but the requirements for reliable switching and reliable differentiation in the output states remain. Also, if a nondestructive read-out operation is desired, the tunnel diode must remain unswitched by the read-out control signals. In prior tunnel diode memory circuits, the difference in the output signals is determined by the different ratios between the diode impedance and the series bias resistance. Since the ratio for a diode in the high-voltage state is rather small, the output is effectively attenuated by the bias resistor and there is therefore difficulty in obtaining reliably distinguishable output signals.

Another problem with tunnel diode bistable circuits is the reliance of a 1 output state upon the portion of the characteristic beyond the negative resistance region. This is the portion of the characteristic which tends to vary most from diode to diode because it is produced by the composite action of the tunneling effect and the conventional rectifying effect produced at a semiconductor diode junction. Since the rectifying effect is variable, this region is variable. It is also relatively sensitive to temperature variations.

It is therefore an object of the invention to provide a bistable tunnel diode circuit with reliable threshold switching operation which permits substantial variations in the parameters of the circuit and the tunnel diode.

It is a further object of the invention to provide a bistable tunnel diode circuit, whose output condition is relatively insensitive to changes in diode variations.

It is another object of the invention to provide a bistable tunnel diode circuit in which the differential output current substantially exceeds the difference between the "peak" and "valley" currents of a switched tunnel diode in a single diode threshold circuit.

Briefly stated, in accordance with one aspect of the invention, a novel bistable tunnel diode circuit is provided by a first tunnel diode, shunted by a comparatively large valued resistor, in series with a second tunnel diode. When a D.C. bias voltage is applied across the series combination which is sufficient to maintain one and only one diode in the high-voltage, low-current state, the series is bistable in that either (but only one) diode may be at the low-voltage, high-current operating point. The circuit is further provided with reset means for putting the second diode at the low-voltage, high-current operating points. When an input signal is applied to the second diode, which provides a current greater than the threshold current necessary to switch the second diode, the operating states of the bistable, series-connected diodes will be reversed. If a logic network is provided to receive input signals and applies a current to the second diode which is greater or less than the threshold switching current in accordance with the desired logic, a bistable logic circuit is produced. Output signals are conveniently available as a current obtained in a resistor connected at the junction of the diodes. The useful output current is the sum of the increase in the first diode and the decrease in the second.

The features of the invention which are believed to be novel are set forth with particularity in the appended claims. The invention itself, however, both as to its organization and method of operation, together with further objects and advantages thereof, may best be understood by reference to the following description when taken in connection with the drawings wherein:

The tunnel diode is physically characterized by a narrow transition junction between n-type and p-type semiconductor regions on the order of one hundred angstrom units in thickness, which regions are doped to a carrier concentration on the order of $10^{19}$ per cubic centimeter so as to give rise to a degenerate, tunneling action. Tunnel diodes have been successfully fabricated of germanium and silicon and are primarily useful for their negative resistance feature.

Figure 1:
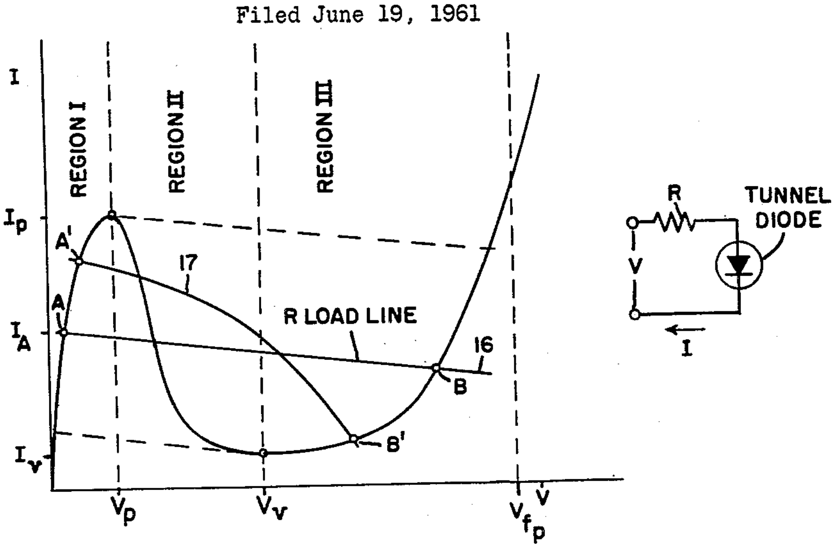
FIGURE 1 is a typical current-voltage graph of a tunnel diode characteristic illustrating features pertinent to the operation of a bistable circuit constructed in accordance with the invention.

FIGURE 1 includes a typical graph of the current-voltage characteristic of a tunnel diode illustrating some of the important electrical properties and load lines of two circuits are also plotted. The useful range of the current-voltage characteristic 15 may be considered as comprised of three regions in the forward current quadrant. Region I extends from zero voltage and current to a maximum or "peak" current "$I_p$" at a relatively low voltage $V_p$. For convenience, this low voltage $V_p$ is commonly called the "peak" voltage. Region II extends from the peak current point to a minimum or "valley" current $I_v$ point of relatively high or "valley" voltage $V_v$. Region II is the negative resistance portion of the tunnel diode characteristic within which the slope or conductance of the characteristic is everywhere negative and increases in voltage are accompanied by current reductions. The ratio of peak current $I_p$ to valley current $I_v$ is typically greater than 10. Region III extends from the valley current point to a relatively large current point at a higher voltage. The upper bound of region III is selected at a point having a current equal to the peak current because operation is based upon the relative states in regions I and III and currents exceeding the peak current do not generally provide useful comparisons for the applications considered herein. This point is commonly represented as "$V_{fp}$."

With a nonlinear load impedance such as that produced by a pair of series connected tunnel diodes, the load line for each tunnel diode is of the form represented at 17 in FIGURE 1. When the load diode is in a high-voltage, low-current state, the other diode will be in region I at point A' with a large impedance load line. If the diodes are switched, the load diode will be in the low-voltage, high-current state and the other diode will be in region III at point B' with a small impedance load line. The current differential between points A' and B' can not exist in a simple series circuit. This current differential is the output current which appears in the load. In a "Goto-pair," which is comprised of a pair of series connected diodes, the load may be considered to provide a current path in parallel with the particular tunnel diode in the high-voltage, low-current state at B'. Depending upon which switching state exists, output currents of opposite polarity and equal magnitude are produced.

As is well known, devices having negative resistance characteristics can be operated in circuits which produce astable, monostable and bistable operation. When a circuit has a load line such as that shown at 16 in FIGURE 1, it can be operated bistably. For example, when a tunnel diode is connected in series with a resistance exceeding the magnitude of its negative resistance at the intersection of the load line with the diode characteristic and a proper bias voltage is applied, there are two possible stable points on the tunnel diode characteristic indicated at A and B. These points occur respectively in regions I and III and are conveniently termed the low-voltage, high-current point and the high-voltage, low-current point. When a current equal to $I_p-I_A$ is applied to a tunnel diode operating at point A for a short period, the tunnel diode will switch to point B, following the upper dashed line from the peak current directly across to region III. From the high-voltage, low-current state at point B, the diode can be switched along the lower dashed line to point A by reducing the voltage or current below the valley point for a short period.

Figure 2:
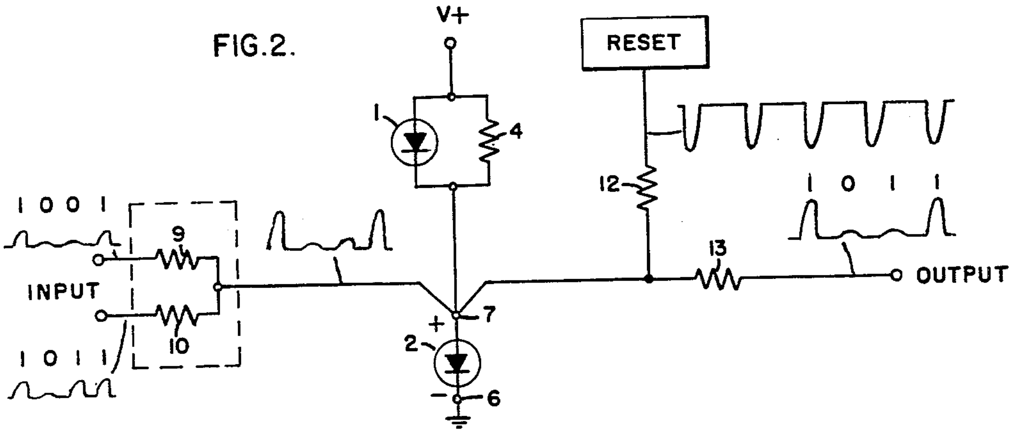
FIGURE 2 is a schematic diagram of a bistable tunnel diode circuit incorporating the invention.

FIGURE 2 is a schematic diagram of a novel tunnel diode bistable circuit. A pair of tunnel diodes 1, 2 are series connected between a source of bias V+ and ground. The tunnel diode 1 is poled in a forward direction relative to the bias source and is connected in parallel with a resistor 4 having a large value. The diode 2 is similary poled, with the negative terminal 6 connected to a source of reference potential represented as ground and the positive terminal 7 connected to the parallel combination of tunnel diode 1 and resistor 4. Positive going input signals are applied through summing resistors 9, 10 connected to the positive terminal 7 of diode 2. A source of negative going reset pulses is connected to terminal 7 through resistor 12 and output pulses are obtained from terminal 7 through resistor 13.

The operation of the FIGURE 2 circuit may be compared to the operation of a "Goto-pair." The bias applied across the tunnel diodes 1, 2 is sufficient to maintain one diode at a high-voltage, low-current operating point but is insufficient to maintain both diodes at a high voltage, low-current operating point. The output signal is determined by which of two opposite operating points the tunnel diodes are at. It is in this respect that the operation is similar to a "Goto-pair," but in other respects, the FIGURE 2 circuit operates in a different manner. Before an input signal is received, the circuit is reset by reset signal of opposite polarity to the input signals applied through resistor 12. A source of negative voltage will switch diode 2 to a low-voltage point, if it was originally at a high-voltage point, and diode 1 will be switched to a high-voltage point. Input signals applied to the summing resistors 9, 10 which produce a current increment that increases the diode 2 current above $I_p$ will switch diode 2 to a high-voltage point. The illustrated waveforms are for operation as an AND gate with the resistors 9, 10 selected to require 1 input signal through both to produce switching. The reverse switching operation occurs in diede 1 so that an increase in the output current is provided which is the sum of the reduction in the diode 2 current and the increase in the current through the parallel combination of diode 1 and resistor 4. With the proper selection of circuit values, the output current will reliably approach the peak current of diode 1. The output pulse can then be connected to a subsequent circuit of the FIGURE 2 type. The load resistor 13 will correspond to one of the summing resistors 9, 10 in FIGURE 2.

As can readily be seen, the operation of the FIGURE 2 circuit is very different from the operation of a "Goto-pair." In the latter, the input pulses are of opposite polarity to represent 1 and 0 bits and they are applied to the junction of a pair of series connected tunnel diodes before pulses of opposite polarity bias voltage are applied across the pair. In this arrangement, the tunnel diodes assume opposite states in accordance with the polarity of the applied input pulse. In contrast, the FIGURE 2 circuit has the bias applied continuously over each cycle of operation and reset pulses are initially applied to always set the second tunnel diode in the low-voltage state. The output signals are then dependent upon a 1 input current signal switching the second diode to a high-voltage state. This mode of operation is unsymmetrical and therefore does not require the matching of the tunnel diodes usually necessary in Goto-pairs. In fact, the FIGURE 2 circuit requires a differential output current for the 1 and 0 output signals. It has been found that the use of a resistor in parallel with the first tunnel diode enables the circuit to produce the desired differential output current.

In a bistable circuit of the type illustrated in FIGURE 2, reliable and useful operation has two aspects: there should be sufficiently large differences between the outputs obtained for the two stable operating points and there should be reliable threshold switching response to applied input signals. The problems in insuring reliable switching arise in providing a circuit which will have reasonable tolerance to variations in circuit parameters and states.

The novel circuit of FIGURE 2 is advantageous for providing a substantial difference in the output signals. Normal circuit operation requires input signals whose sum exceeds a threshold value to produce an output signal which has a substantial value, here, current through resistor 13, and that input signals having any sum less than the threshold value produce an output signal which can be neglected. Often there are more than one possible input current sums for a given output state, and it is essential that the output state be the same for all such input combinations. For example, in a two input OR gate, the output state should be the same for either a single 1 input or two 1 inputs. For a zero output state, the current $I_A$ flows through the tunnel diode 2 and there is little voltage across the output. If diode 2 is switched to the high-voltage, low-current point, a relatively large current flows in the output. Since this current differential is essentially the sum of the current reduction in diode 2 and the current increase in diode 1, there is a relatively large differential in the output current as compared with a conventional tunnel diode threshold logic circuit which relies on only the current differential diode 2. (The current in reset resistor 12 and the differential current in resistor 4 are negligible.) Since the 1 output state is largely determined by the current $I_A$ in diode 1, variations in the region III characteristic of diode 1 will have less effect than in a conventional tunnel diode threshold logic circuit.

For reliable switching operation of the FIGURE 2 circuit, the tunnel diode tolerances (for the same diode type) range from 0–5%. For this tolerance range, the tolerances on the remaining components range from 10–5%. (The tolerances are interrelated, as the diode tolerances increase, the remaining tolerances decrease, and vice versa.) However, the tolerances are increased by selecting diodes having a larger peak current for tunnel diode 1. For example, about a further 5% tolerance improvement is obtained when the peak current of tunnel diode 1 is twice that of tunnel diode 2.

In designing a FIGURE 2 switching circuit for a particular application, it is relatively simple to insure reliable operation to provide the desired amplitude output signals. Tunnel diode 2 has an impedance on the order of five ohms over most of region I. Therefore, as long as diode 2 is in this region, there will be negligible output voltage. The particular operating point can be reliably obtained by selecting resistor 4 so that together with parallel diode 1 a bias current of $I_A$ (typically half the peak current of diode 2) can be provided for diode 2. This resistor 4 reduces the dependency of the operating point of diode 2 upon the characteristics of diode 1 and the tolerance of the circuit to variation, in diode 1, particularly as to minimum valley current. The improvement in the selection of bias point $I_A$ will also reduce the possibility of switching failure resulting from diode 2 having an operating point $I_A$ too low as a result of insufficient current from diode 1. When the diode 2 is in the high-voltage, low-current state, it has an impedance of 10 to 100 times that in region I, and whatever current does exist is essentially an undesired diversion from the output. The presence of resistor 4 whose impedance is of the same order as but in excess of that of diode 2 in the high-voltage condition increases the available current and tends to make up for the loss.

A tunnel diode in the high-voltage state presents a large impedance sufficient to provide a load line which will maintain a second series tunnel diode (in the low-voltage state) in a stable state. When a resistor is placed in parallel with the first tunnel diode, the series impedance is reduced. To maintain bistable operation, this resistor must not reduce the series impedance to less than the magnitude of the negative resistance of the second tunnel diode. If monostable operation is desired, the resistor selected will be made small and an inductance will be placed in series with second tunnel diode.

A system employing several FIGURE 2 circuits relies on the output of one circuit providing an input to a subsequent circuit. In a dynamic pulse system, the circuit output is provided in pulse form by the use of conventional capacitor couplings so that a circuit switching from a 0 to 1 state produces a compatible pulse. Because of the nature of the tunnel diode device, the bistable circuit has only one port (or two terminals). For this reason, it is necessary to provide means to maintain a unilateral flow of information. One method of providing this function is to use 3-phase bias supplies and logic interconnections similar to the parametric subharmonic oscillator system described in the Proceedings of the IRE, volume 47, August 1959, pp. 1304–1316 ("The Parametron, A Digital Computing Element Which Utilizes Parametric Oscillation" by E. Goto). However, efficiency can be increased by providing isolating means such as a diode or transistor in the input circuitry to the tunnel diodes so that switching current appears only in the output.

The reason that the output signals from the FIGURE 2 circuit are more uniform than in prior art tunnel diode circuits is that for both states of the novel bistable circuit, the output voltage is primarily determined by the low-voltage state of a tunnel diode rather than the high-voltage state. For a 0 output, with tunnel diode 1 in the high-voltage state and tunnel diode 2 in the low-voltage state, the impedance of diode 2 is easily made a small fraction of the diode 1 impedance. Accordingly, the output voltage is reliably made negligible. For a 1 output, with diode 1 in the low-voltage state and diode 2 in the high-voltage state, the impedance of diode 1 is easily made a small fraction of the diode 2 impedance. Accordingly, the reference voltage is practically directly connected to the output and uniformly high-voltage output signals are obtained.

The FIGURE 2 circuit has been shown and described as operating with positive going pulses. To adapt the circuit for negative going pulses, only straightforward changes are required. The polarity of the bias voltage and the reset pulses are reversed and the diodes are poled in the reverse direction relative to ground. The terminal 6 of diode 2 in FIGURE 2 is shown as connected to ground. It is to be understood that this is based upon the convention of considering the ground voltage to be the reference voltage relative to which the input pulses are produced.

Figure 3:
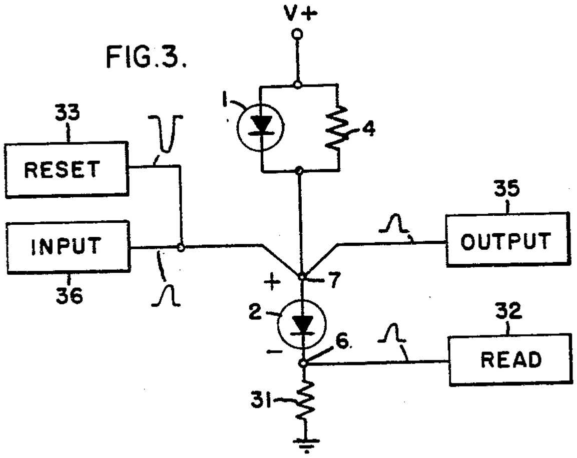
FIGURE 3 is a modification of the FIGURE 2 circuit particularly suitable for memory applications.

The bistable logic circuit of FIGURE 3 is a modification of the FIGURE 2 circuit particularly adapted to memory applications but retaining high threshold reliability. The same basic elements are indicated by the same reference characters. A first tunnel diode 1 is connected in parallel with a large resistor 4 and the parallel combination is connected in series with a second tunnel diode 2. A second resistor 31 is connected between the negative terminal 6 of diode 2 and the reference potential shown as ground and the positive terminal of diode 1 is connected to a bias source V+. A source of input signals 36 is connected to the positive terminal 7 of diode 2 and applies switching currents to this diode. The input circuit 36 may be an analog summation circuit similar to the network in FIGURE 2 which includes resistors 9 and 10, however, for a memory array application, an input signal from an intermediate storage register normally would be applied. A source of positive read-out control pulses 32 is connected to the negative terminal 7 of diode 2. These pulses will produce different amplitude pulses across diode 2 in accordance with its condition. An output circuit 35 is connected to the positive terminal 7 of diode 2 which is responsive to the different amplitude pulses.

The operation of the FIGURE 3 circuit is similar to the FIGURE 2 circuit operation. Tunnel diode 2 is initially set to a low-voltage, high-current point by a negative pulse from reset pulse source 33. A D.C. bias is provided which maintains one and only one tunnel diode in the high-voltage, low-current state. Accordingly, the diode 2 is bistable and a current signal from input 36 which exceeds the threshold current will switch diode 2 to a high-voltage, low-current point. When a reading positive pulse is subsequently applied to terminal 6 of diode 2 from read source 32, a greatly attenuated pulse will appear at the output 35. Conversely, if diode 2 is not switched, it will be in the low impedance region I and the read pulse will appear at output 35 with little voltage attenuation. The read-out pulses have an inverse relation to the stored digital data. A stored 1 will produce a negligible output voltage and a stored 0 will produce a positive pulse.

The applied read control pulses have an amplitude insufficient to reset the diode 2. Because of the low impedance offered by diode 1, these pulses are greater than would be permitted by the resistor 4 alone and larger tolerances are thereby permitted. It is preferred that resistor 4 be selected to have a substantially larger resistance than resistor 31, since the latter component serves primarily to avoid shorting of the read control pulses. However, it will be noted that if diode 2 is lightly loaded, the current thereacross will be low for the region III stable point. As the series load decreases towards the magnitude of the tunnel diode negative resistance, the current approaches the valley current. The result is that there is substantial change in the current for the two stable points and a corresponding variation in the voltage across resistor 31 is available as an output.

While particular embodiments of the invention have been shown and described, it should be understood that the invention is not limited thereto. It is intended in the appended claims to claim all such variations as fall within the true spirit of the present invention.

What is claimed is:

1. A threshold logic circuit comprising: a first tunnel diode having given peak and valley currents; a second tunnel diode, having given peak and valley currents, connected in series with said first tunnel diode and being poled in the same direction; a resistor connected in parallel with said first tunnel diode to provide an additional current path to said second diode; negligible impedance means connecting the circuit comprised of said first and second diodes and said resistor across a D.C. voltage source having a voltage sufficient to maintain said first diode in the high-voltage state and said second diode in the low-voltage state; reset means for initially presetting said second tunnel diode in the low-voltage state; and input means connected to the junction of said first and second diodes to apply a current signal such as to switch said second diode from the low-voltage, high-current state to a high-voltage, low-current state.

2. A bistable threshold logic circuit comprising: a first tunnel diode having given peak and valley currents; a second tunnel diode, having given peak and valley currents, connected in series with said first tunnel diode and being poled in the same direction; a resistor connected in parallel with said first tunnel diode to provide an additional current path to said second diode for establishing the optimum low-voltage, high-current operating point for said second diode; negligible impedance means connecting the circuit comprised of said first and second diodes and said resistor across a D.-C. voltage source having a voltage sufficient to maintain said first diode in the high-voltage state and said second diode in the low-voltage state; reset means for initially presetting said second tunnel diode in the low-voltage state; and input means connected to the junction of said diodes to apply a current signal such as to switch said second diode from the low-voltage, high-current state to a high-voltage, low-current state.

3. A bistable threshold logic circuit comprising: a first tunnel diode having given peak and valley currents; a second tunnel diode, having given peak and valley currents, connected in series with said first tunnel diode and being poled in the same direction; a resistor connected in parallel with said first tunnel diode to provide an additional current path to said second diode such as to produce current through the parallel combination of said first tunnel diode and said parallel resistor which is a substantial fraction of the peak current of said second diode and a substantial increment over the current through said second diode; negligible impedance means connecting the circuit comprised of said first and second diodes and said resistor across a D.-C. voltage source having a voltage sufficient to maintain said first diode in the high-voltage state and said second diode in the low-voltage state; reset means connected to the junction of said diodes for initially applying a reset pulse of a given polarity to preset said second tunnel diode prior to signal application in the low-voltage state; and input means connected to the junction of said diodes to apply current pulses, having a polarity opposite to that of said reset pulse, such as to switch said second diode from a low-voltage, high-current state to a high-voltage, low-current state.

4. The bistable circuit of claim 3 wherein: said input means is adapted to receive at least one digital input signal at selected voltage levels and apply corresponding current signals above and below the threshold switching current to said second diode in accordance with the desired logic.

5. The bistable circuit of claim 3 wherein: said input means includes a plurality of analog summing resistors which are connected to the junction of said diodes, said summing resistors having resistances selected such that input signals applied to them produce a combined current above or below the threshold switching current for said second diode in accordance with the desired logic.

6. The bistable circuit of claim 3 further comprising: output means including a resistor connected to the junction of said diodes.

7. A bistable threshold logic circuit comprising: a first tunnel diode having given peak and valley currents; a second tunnel diode having given peak and valley currents; a first resistor; means consecutively connecting said first diode, said second diode and said first resistor in series; a second resistor connected in parallel with said first tunnel diode to provide an additional current path to said second diode; negligible impedance means connecting the circuit comprised of said diodes and said resistors across a D.-C. voltage source having a voltage sufficient to maintain said first diode in the high-voltage state and said second diode in the low-voltage state; and input means connected to the junction of said diodes to apply a current signal such as to switch said second diode from the low-voltage, high-current state to a high-voltage, low-current state.

8. A bistable threshold logic circuit comprising: a first tunnel diode having given peak and valley currents; a second tunnel diode having given peak and valley currents; a first resistor; means consecutively connecting said first diode, said second diode and said first resistor in series; a second resistor connected in parallel with said first tunnel diode to provide an additional current path to said second diode such as to produce current through the parallel combination of said first tunnel diode and said parallel resistor which is a substantial fraction of the peak current of said second diode and a substantial increment over the current through said second diode; negligible impedance means connecting the circuit comprised of said diodes and said resistors across a D.-C. voltage source having a voltage sufficient to maintain said first diode in the high-voltage state and said second diode in the low-voltage state; reset means connected to the junction of said diodes for initially applying a reset pulse of a given polarity to preset said second diode in the low-voltage state; and input means connected to the junction of said diodes to apply a current pulse such as to switch said second diode from the low-voltage, high-current state to a high-voltage, low-current state.

9. The bistable circuit of claim 8 wherein: said input means is adapted to receive at least one digital input signal at selected voltage levels and apply corresponding current signals to said second diode above and below the threshold switching current.

10. The bistable circuit of claim 8 further including: a source of read control pulses connected to the junction of said first resistor and said second diode to produce output signals at the junction of said diodes in accordance with the condition of said second diode.

11. A bistable logic circuit comprising: a first tunnel diode; a second tunnel diode, having a peak current substantially less than that of said first tunnel diode, connected in series with said first tunnel diode, said diodes being poled in the same direction; a resistor connected with said first tunnel diode and having a resistance selected to provide a bias current, in conjunction with said first diode, for maintaining current in said second diode at a level suitable for switching when said second diode is in the low-voltage state; negligible impedance means connecting the circuit comprised of said diodes and said resistor between a source of reference potential and a D.-C. voltage source providing a bias voltage greater than the peak voltage of said first diode and less than the sum of the peak voltages of both said diodes; a plurality of analog summing resistors connected in parallel to the junction of said diodes, said summing resistors having resistances selected such that input signals applied to them produce a combined current above or below the threshold switching current for said second diode in accordance with the desired logic; and reset means connected to the junction of said diode to periodically apply pulses to reset said second diode to the low-voltage, high-current state.

References Cited in the file of this patent

UNITED STATES PATENTS 3,027,464 Kosonocky ............. Mar. 27, 1962

OTHER REFERENCES

Berry et al.: Session X, 1961 International Solid-State Circuits Conference, February 17, 1961, Winner, N.Y. (pages 112, 113, page 113 relied on).